(12) United States Patent
Yang et al.

(10) Patent No.: US 9,223,296 B2
(45) Date of Patent: Dec. 29, 2015

(54) WRISTWATCH STRUCTURE, ELECTRONIC CROWN FOR WRISTWATCH, AND WRISTWATCH HAVING DISPLAY

(71) Applicant: Princo Middle East FZE, Dubai (AE)

(72) Inventors: Chih-kuang Yang, Hsinchu (TW); Yeong-yan Guu, Hsinchu (TW); Cheng-yi Chang, Hsinchu (TW); Gan-how Shaue, Hsinchu (TW)

(73) Assignee: PRINCO MIDDLE EAST FZE, Dubai (AE)

( * ) Notice: Subject to any disclaimer, the term of this patent is extended or adjusted under 35 U.S.C. 154(b) by 0 days.

(21) Appl. No.: 14/188,073

(22) Filed: Feb. 24, 2014

(65) Prior Publication Data

US 2014/0328147 A1    Nov. 6, 2014

(30) Foreign Application Priority Data

May 6, 2013   (TW) .............................. 102116081 A

(51) Int. Cl.
*G04G 9/00*    (2006.01)
*G04G 17/04*   (2006.01)
*G04C 3/12*    (2006.01)
*G04C 3/00*    (2006.01)

(52) U.S. Cl.
CPC .............. *G04G 9/0064* (2013.01); *G04C 3/004* (2013.01); *G04C 3/007* (2013.01); *G04C 3/008* (2013.01); *G04C 3/12* (2013.01); *G04G 17/04* (2013.01)

(58) Field of Classification Search
CPC ..... G04G 9/0064; G04G 17/06; G04G 17/04; G04C 3/00; G04C 4/005–4/008; G04C 3/005–3/008; G04C 3/004; G04C 3/12

USPC .................................. 368/155, 204, 308, 321
See application file for complete search history.

(56) References Cited

U.S. PATENT DOCUMENTS

| | | | | | |
|---|---|---|---|---|---|
| 4,465,378 | A | * | 8/1984 | Maurer et al. | 368/88 |
| 4,468,131 | A | * | 8/1984 | Bui et al. | 368/69 |
| 4,555,184 | A | * | 11/1985 | Fujimori | 368/88 |
| 4,681,464 | A | * | 7/1987 | Ray | 368/157 |
| 5,008,868 | A | * | 4/1991 | Ikegami | 368/88 |
| 6,252,825 | B1 | | 6/2001 | Perotto | |

(Continued)

FOREIGN PATENT DOCUMENTS

| | | |
|---|---|---|
| JP | 54-135573 | 10/1979 |
| JP | 56-140279 | 11/1981 |

(Continued)

*Primary Examiner* — Amy Cohen Johnson
*Assistant Examiner* — Mathew Powell
(74) *Attorney, Agent, or Firm* — Hauptman Ham, LLP

(57) ABSTRACT

The present invention provides a wristwatch structure, an electronic crown for wristwatch, and a wristwatch having a display. The wristwatch structure comprises an electric driving component; an electronic core having a plurality of two-dimensional joints; and an electronic crown comprising a rotating portion and a fixed detecting portion, the detecting portion detecting electronic signals according to a rotation of the rotating portion; wherein the detecting portion of the electronic crown exports the electronic signals to the electronic core via one of the joints, and the electric driving component is electrically connected to one set of joints among the two-dimensional joints. The present invention can improve compatibility for various designs, thereby shortening product development cycle. Also, the present invention is suitable for developing a product with appearance similar to a mechanical watch.

16 Claims, 12 Drawing Sheets

(56) References Cited

U.S. PATENT DOCUMENTS

| | | | |
|---|---|---|---|
| 7,336,268 B1* | 2/2008 | Camp et al. | 345/204 |
| 7,404,667 B2* | 7/2008 | Born et al. | 368/190 |
| 7,794,138 B2* | 9/2010 | Hilfiker | 368/190 |
| 2004/0013042 A1* | 1/2004 | Farine | 368/10 |
| 2004/0233794 A1* | 11/2004 | Maruyama et al. | 368/157 |
| 2007/0008823 A1* | 1/2007 | Plancon | 368/28 |
| 2007/0291593 A1* | 12/2007 | Tokoro et al. | 368/221 |
| 2008/0111449 A1* | 5/2008 | Paratte et al. | 310/311 |
| 2008/0112275 A1 | 5/2008 | Born et al. | |
| 2010/0220559 A1* | 9/2010 | Galie et al. | 368/220 |
| 2011/0156276 A1 | 6/2011 | Roberts et al. | |
| 2011/0235471 A1* | 9/2011 | Luk et al. | 368/69 |

FOREIGN PATENT DOCUMENTS

| | | |
|---|---|---|
| JP | 57-175980 | 10/1982 |
| JP | 2001-524206 | 11/2001 |
| JP | 2004-079410 | 3/2004 |
| JP | 2008-122377 | 5/2008 |
| JP | 2010-139252 | 6/2010 |
| JP | 2012-516996 | 7/2012 |
| JP | 2013-511160 | 3/2013 |

\* cited by examiner

WRISTWATCH STRUCTURE, ELECTRONIC CROWN FOR WRISTWATCH, AND WRISTWATCH HAVING DISPLAY

CROSS-REFERENCE TO RELATED APPLICATION

This application claims priority from and the benefit under 35 U.S.C. §119(a) of Taiwanese Patent Application No. 102116081, filed on May 6, 2013 in the TIPO (Taiwan Intellectual Property Office), which is hereby incorporated by reference for all purposes as if fully set forth herein.

TECHNICAL FIELD OF THE INVENTION

The present invention relates to an electric mechanical clock, and more particularly, to a wristwatch structure powered by an electric power, an electronic core for a wristwatch, an electronic crown, a wristwatch having a display, and a method for manufacturing a wristwatch.

BACKGROUND OF THE INVENTION

A mechanical watch is a symbol of taste for modern people. The extremely complicated mechanical design appears an excellent art in modern technology. The difference between an electric mechanical watch and the mechanical watch is that the electric mechanical watch uses a motor driven by the electric power to actuate physical hands on a clock to indicate time information. Although the electric mechanical watch may not be as durable as the mechanical watch and the batteries may have to be replaced frequently, the electrical mechanical watch basically has the clock hands as the mechanical watch. However, the electrical mechanical watch is much cheaper, and thereby has lots of consumers and becomes a mainstream in the market. The problem of the need to develop electronic cores in response to different wristwatch designs exists in conventional electric mechanical watches. Currently, it lacks an effective solution in the manufacture and assembling.

SUMMARY OF THE INVENTION

An objective of the present invention is to provide a wristwatch structure, an electronic core and an electronic crown for a wristwatch, a wristwatch having a display, and a method for manufacturing a wristwatch, for solving the traditional problem of the need to develop electronic cores in response to different wristwatch designs.

An objective of the present invention is to provide a wristwatch structure, an electronic core and an electronic crown for a wristwatch, a wristwatch having a display, and a method for manufacturing a wristwatch, for shortening the product development cycle.

An objective of the present invention is to provide a wristwatch structure, an electronic core and an electronic crown for a wristwatch, a wristwatch having a display, and a method for manufacturing a wristwatch, for increasing the freedom in assembling or manufacturing the wristwatch and improving the compatibility for various wristwatch designs.

To achieve the above objectives, the present invention provides a wristwatch structure, comprising: a dial; an indicator arranged in accordance with the dial; an electric driving component connected to the indicator, for driving the indicator to make the indicator operate correspondingly; and an electronic core having an integrated circuit unit packaged therein, the electronic core having a plurality of two-dimensional junction points distributed on an external surface thereof; wherein the electric driving component is electrically connected to the integrated circuit unit of the electronic core through one set of junction points among the two-dimensional junction points.

In another aspect, the present invention provides an electronic core for a wristwatch, the wristwatch having an indicator and an electric driving component used to drive the indicator to make the indicator operate correspondingly, said electronic core comprising: a multi-layer interconnection substrate; and an integrated circuit unit disposed on the multi-layer interconnection substrate, the multi-layer interconnection substrate having a plurality of two-dimensional junction points; wherein the electric driving component is electrically connected to the integrated circuit unit through one set of junction points among the two-dimensional junction points.

In still another aspect, the present invention provides a method for manufacturing a wristwatch, comprising steps of: designing a dial and an indicator, a design of the indicator cooperating with that of the dial; providing an electronic core, which has two-dimensional junction points distributed on an external surface thereof; designing position of at least one electric driving component on the external surface of the electronic core according to the position of the indicator, the electric driving component being used to drive the indicator to make the indicator operate correspondingly; connecting a pin of the electric driving component to at least one point of the junction points on the external surface of the electronic core; defining connection paths between inner circuits of the electronic core and the two-dimensional junction points so as to electrically connect the electric driving component to a specific circuit inside the electronic core; and packaging the dial, the indicator, the electric driving component, and the electronic core into a watchcase.

In still another aspect, the present invention provides a wristwatch structure, which has a dial, an indicator arranged in accordance with the dial, and an electric driving component connected to the indicator, the electric driving component being used to drive the indicator to make the indicator operate correspondingly, said wristwatch structure comprising: an electronic core having an integrated circuit unit packaged therein, the electronic core having a plurality of two-dimensional junction points; and an electronic crown having a rotating part and a sensor, the sensor having a rotating portion and a fixed detecting portion, the detecting portion detecting an electronic signal according to a rotation of the rotating portion for altering a state of the indicator; wherein the detecting portion of the electronic crown exports the electronic signal to the electronic core via one junction point among the two-dimensional junction points, and the electric driving component is electrically connected to one set of junction points among the two-dimensional junction points.

In still another aspect, the present invention provides an electronic crown for a wristwatch, comprising: a rotating part for being held by a user; and a sensor coupled with the rotating part, the sensor having a rotating portion and a fixed detecting portion, the rotating portion comprising at least two sub portions, which possess a physical characteristic, the at least two sub portions having different physical values with respect to said characteristic, the detecting portion of the electronic crown detecting different physical values of the at least two sub portions to export different levels of electronic signals.

In still another aspect, the present invention provides a wristwatch having a display, comprising: the display for displaying time relevant information on a screen and for displaying a plurality of items listed in an operation menu on the screen; an electronic crown comprising a rotating part and a sensor, the sensor having a rotating portion and a fixed detecting portion, the detecting portion exporting an electronic signal so as to switch the items listed in the operation menu when the rotating portion is rotated.

In the present invention, the electrical connection between the electric driving component and its corresponding circuit of the integrated circuit unit can be carried out as long as the pins of the electric driving component fall onto any one set of junction points among the two-dimensional junction points on the electronic core. Therefore, by using the electronic core provided in the present invention, the wristwatch manufacturers can develop various kinds of wristwatches. Also, the present invention benefits the development of emulated mechanical watches, of which the appearances are similar to the mechanical watches. Moreover, in the present invention, the freedom in assembling the wristwatch is increased and the compatibility between various designs is improved as well. In another aspect, it is convenient for the wristwatch manufacturers to achieve various wristwatch designs by adopting the universal electronic core, thereby shortening the product development cycle. Also, the present invention solves the traditional problem of the need to develop electronic cores in response to different wristwatch designs. Also, the universal electronic core may be connected to peripheral electronic components so as to develop a wristwatch having many novel features.

DETAILED DESCRIPTION OF THE INVENTION

Figure 1:
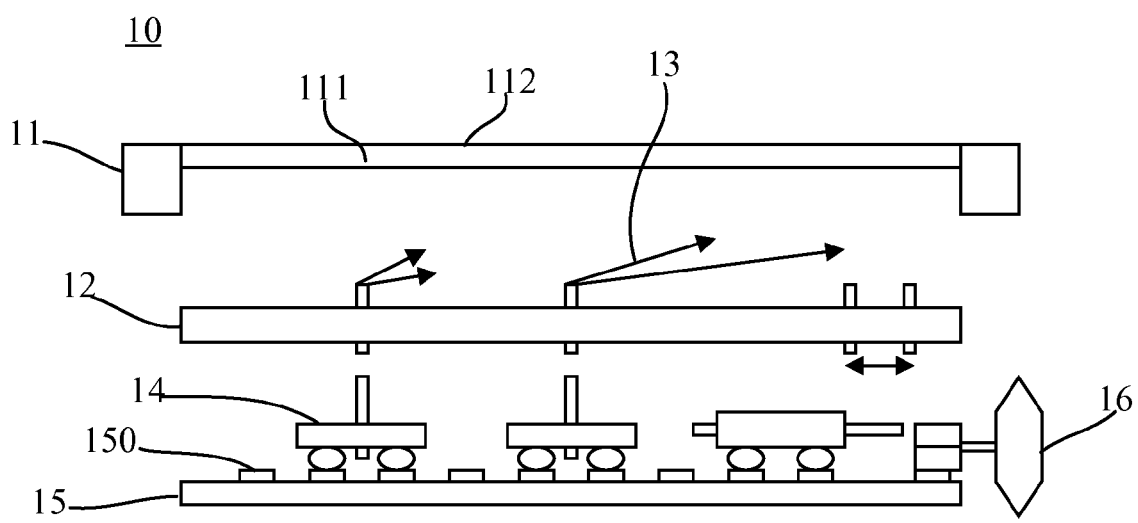
FIG. 1 is a structural diagram showing a wristwatch implemented according to the present invention.

Referring to FIG. 1, which is a structural diagram showing a wristwatch 10 implemented according to the present invention. The wristwatch 10 of the present invention comprises a watchcase 11, a dial 12, an indicator 13, an electric driving component 14, an electronic core 15, and a crown 16. The watchcase 11 is used to protect the electronic devices and mechanical structures arranged inside the wristwatch 10. The watchcase 11 has a clock surface 112 formed by a transparent material 111 (such as glass). A user can perceive the position information indicated by the indicator 13 through the transparent clock surface 112. The electric driving component 14 is connected with the indicator 13 directly or indirectly and is used to drive the indicator 13 such that on the dial 12 the indicator 13 moves in a circle or along a straight line, or carries out other similar movements. The electric driving component 14 can be implemented by an electric motor such as a piezoelectric actuator and an ultrasonic micro motor. The electric driving component 14 also can be implemented by an electronic component which can drive the indicator 13 to indicate some particular information. The indicator 13 cooperates with the dial 12 so as to indicate relevant information about time. For example, there are timescales on the dial 12 and the indicator 13 includes physical hour and minute hands for indicating time information such as hours and minutes.

In the following descriptions, it can be known that the present invention is not particularly limited to the designs of the dial 12 and the indicator 13. That is to say, the present invention allows wristwatch manufacturers to design the dial 12 and the indicator 13 freely and then choose applicable electric driving component 14. For example, the wristwatch manufactures may develop a wristwatch having complicated functions. For instance, the wristwatch may display date information (such as years, months, and days), have a display of moon phase, or be equipped with a chronograph function. The wristwatch manufactures may use not only electric motors capable of actuating the indicator to move in a circle or along a straight line, but also appropriate actuating motor components capable of making the indicator move back and forth within a sector, or having a flyback function.

The electronic core 15 of the wristwatch 10 of the present invention has an integrated circuit unit packaged therein (see FIG. 7, described later). The arrangement of the electronic core 15 can provide electronic signals to the electric driving component 14 such that the electric driving component 14 actuates the indicator 13 (such as a hand on a clock) according to the received electronic signals to make the indicator 13 do corresponding movements. In the present invention, the electronic core 15 has a plurality of two-dimensional junction points 150 distributed on an external surface thereof. In one embodiment, the two-dimensional junction points 150 are even distributed and are located at regular positions. The electric driving component 14 is electrically connected to the integrated circuit unit of the electronic core 15 via any one set of junction points among the two-dimensional junction points 150. By using these two-dimensional junction points, the present invention can greatly improve convenience and compatibility for wristwatch assembling.

Specifically speaking, the dial and the indicator may have various kinds of designs and the position of the electric driving component may alter in response to these designs. For the changes of design, conventional wristwatch products have to design different assembling structures or develop corresponding electronic cores. However, in the present invention, the electrical connection between the electric driving component and its corresponding circuit of the integrated circuit unit can be carried out as long as the pins of the electric driving component fall onto any one set of junction points among the two-dimensional junction points on the electronic core. Therefore, by using the electronic core provided in the present invention, the wristwatch manufacturers can develop various kinds of wristwatches. Particularly, wristwatches having various designs of dials and indicators can be developed as long as adopting the electronic core of the present invention. Also, the present invention benefits the development of emulated mechanical watches, of which the appearances are similar to the mechanical watches.

The electric driving component 14 has to electrically connect to corresponding circuit to be functioning normally. In the present invention, the junction points corresponding to a specific circuit can be predetermined on the external surface of the electronic core 15. Alternately, the function of each junction point can be defined during manufacturing or assembling the wristwatch.

Specifically speaking, in one embodiment, a connection path from one of the two-dimensional junction points on the external surface of the electronic core 15 to an inner circuit of the integrated circuit unit is fixed or invariable. That is, the junction points in some particular area of the external surface of the electronic core 15 are provided to one electric driving component 14 for electrically connecting with a circuit corresponding to said electric driving component 14, and the junction points in another area of the external surface of the electronic core 15 are provided to another electric driving component 14 for electrically connecting with a circuit corresponding to said another electric driving component 14.

In another embodiment, the two-dimensional junction points 150 on the external surface of the electronic core 15 are programmable junction points. That is to say, the connection path from each junction point 150 to the inner circuit is variable and settable. For practical applications, the wristwatch may comprise a programmable logic unit, which is used to define the function or use of each junction point 150 and arrange the connection path between each junction point 150 and the inner circuit. In this embodiment, a pin of the electric driving component 14 is connected to any one junction point on the electronic core 15, and then the programmable logic unit defines the respective junction points 15 such that the electric driving component 14 is connected to its corresponding circuit through the junction point. In such a manner, the freedom in assembling the wristwatch is increased and the compatibility between various designs is improved as well.

The aforesaid programmable junction points can be implemented by a programmable logic controller (PLC), a complex programmable logic device (CPLD), a field programmable gate array (FPGA), and etc.

Figure 2:
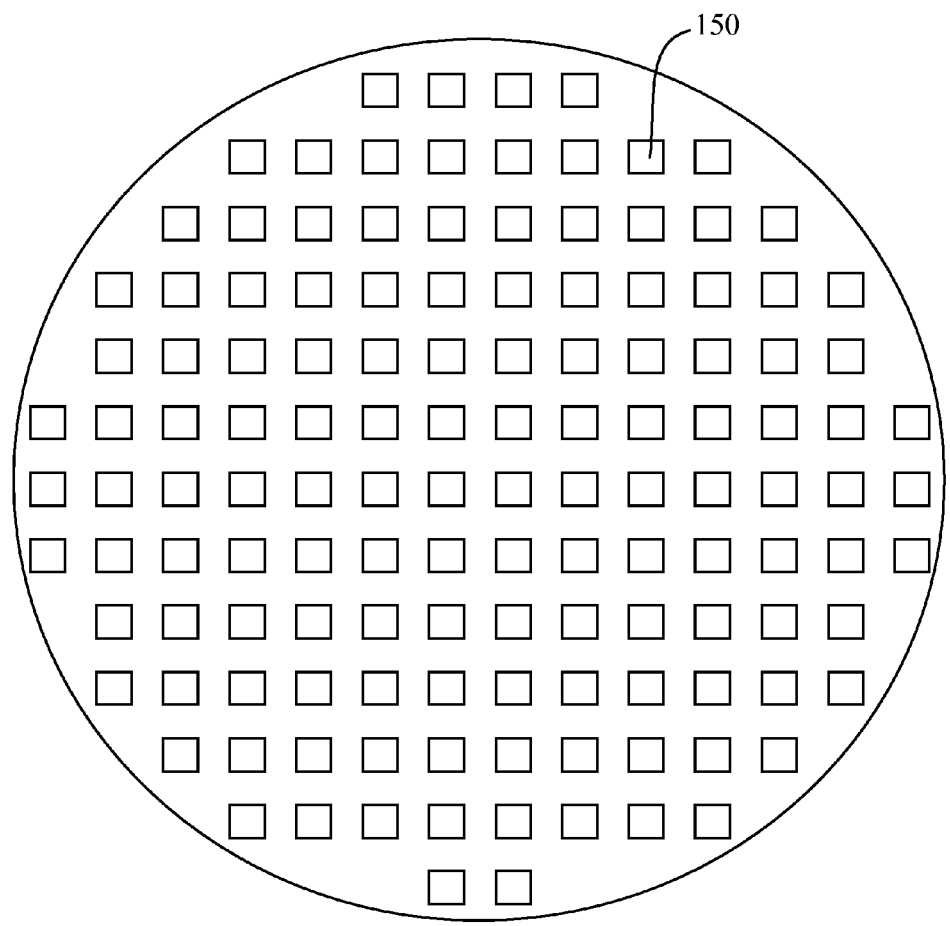
FIG. 2 is a schematic diagram illustrating one example of two-dimensional junction points on the external surface of an electronic core according to the present invention.

FIG. 2 is a schematic diagram illustrating one example of the two-dimensional junction points 150 on the external surface of the electronic core 15 according to the present invention. As shown in FIG. 2, the distribution of the conjunction points 150 forms a two-dimensional array. Each junction point 150 is aligned along a vertical direction and a horizontal direction. The junction points 150 have the same pitch therebetween. The pin of the electric driving component 14 may not accurately fall onto one of the junction points 150. For this situation, the pitch may be reduced so as to accommodate more junction points. It may allow one pin of the electric driving component 14 to contact two or more than two junction points 150 in order to assure reliable electronic connection.

Figure 3:
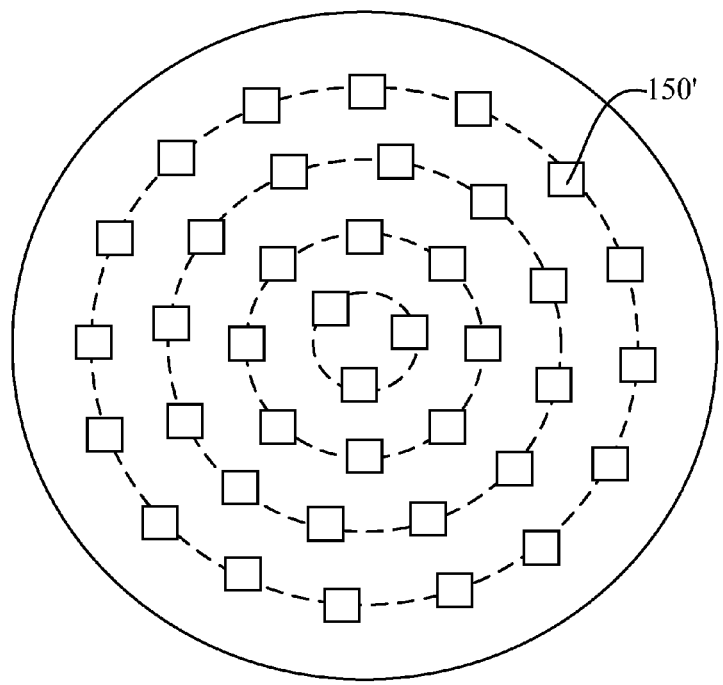
FIG. 3 is a schematic diagram illustrating another example of two-dimensional junction points on the external surface of an electronic core according to the present invention.

In another embodiment, the two-dimensional junction points 150' on the external surface of the electronic core 15 form a concentric circular array distribution. As shown in FIG. 3, the junction points are aligned along the dash lines. For a wristwatch designed as a circular shape, the position of the electric motor may be designed according to a ring-shaped pattern. Therefore, a nearly perfect match is carried out between the circular design and the concentric circular array distribution and the accuracy of collimation between the electric driving component 14 and the junction point is improved accordingly.

Figure 4:
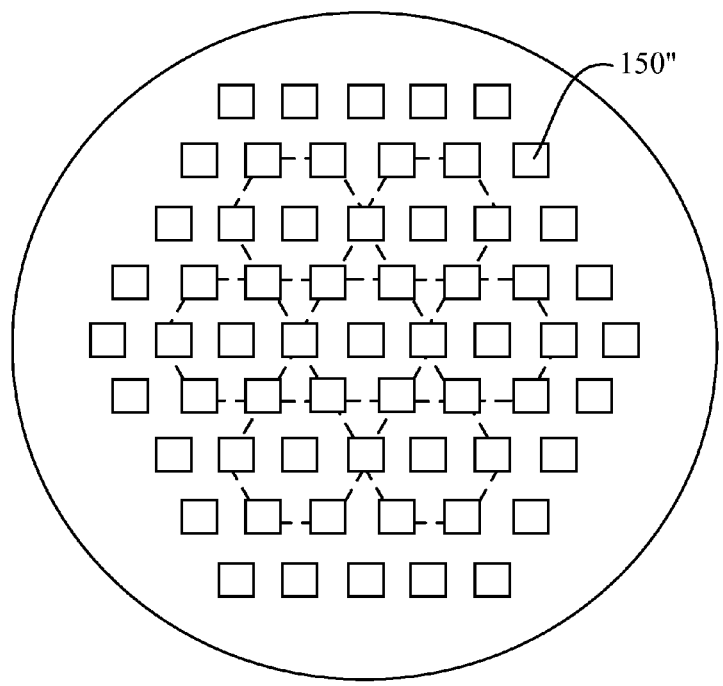
FIG. 4 is a schematic diagram illustrating still another example of two-dimensional junction points on the external surface of an electronic core according to the present invention.

In still another embodiment, the two-dimensional junction points 150" on the external surface of the electronic core 15 are arranged in a hexagonal grid form. As shown in FIG. 4, the junction points are aligned along the dash lines. This alignment makes the junction points be arranged closely and thus the pitches between the junction points can be reduced as much as possible. Accordingly, the collimation accuracy is improved still further.

Figure 5:
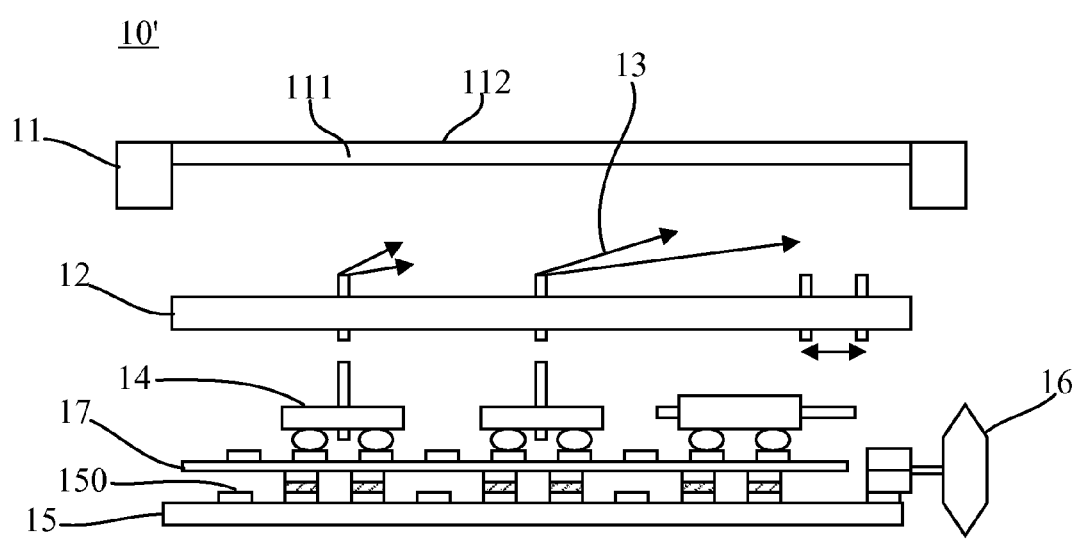
FIG. 5 is a structural diagram showing a wristwatch implemented according to another embodiment of the present invention.

FIG. 5 is a structural diagram showing a wristwatch 10' implemented according to another embodiment of the present invention. The difference between the wristwatch 10' of the present embodiment and the aforesaid wristwatch 10 is that the wristwatch 10' further comprises an interposer 17, which is disposed between the electric driving component 14 and the two-dimensional junction points 150 on the external surface of the electronic core 15. The interposer 17 has conductive junction points distributed on the upper and lower surfaces thereof. The conductive junction points on the upper surface communicate with corresponding conductive junction points on the lower surface. The distribution of the conductive junction points of the interposer 17 is substantially in consistent with that of the junction points 150 on the external surface of the electronic core 15. However, the conductive junction points of the interposer 17 deviate from the junction points of the electronic core 15 along the horizontal direction for a short distance when the interposer 17 has been arranged in the wristwatch 10'. The arrangement of the interposer 17 can further avoid a collimation error occurred between the electric driving component 14 and the junction points 150 on the external surface of the electronic core 15.

Figure 6:
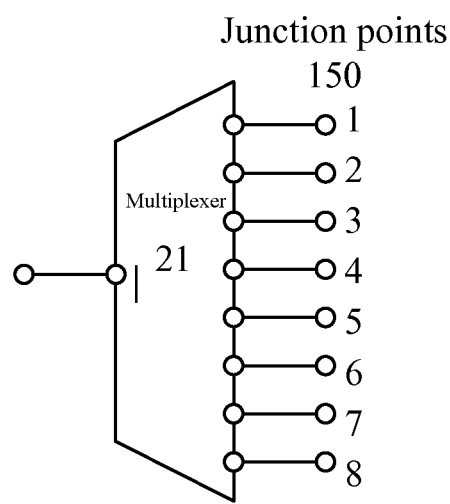
FIG. 6 is a schematic diagram showing a multiplexer in the present invention.

Please refer to FIG. 6. In one embodiment, the electronic core 15 may include a plurality of multiplexers 21 (FIG. 6 only shows one multiplexer). For example, the multiplexers 21 may be 8-to-1 multiplexers. In the electronic core 15, an input/output port of the programmable logic unit is connected to one connecting point on the left side of the multiplexer 21, and the signals are outputted or inputted via one of the eight connecting points on the right side of the multiplexer 21. That is to say, the two-dimensional junction points 150 on the external surface of the electronic core 15 can be formed by the connecting points on the right side of the plural multiplexers 21. When assembling the wristwatch, the pin of the electric driving component 14 is connected to any one point of a set of junction points (e.g., 8 junction points for a set). After that, the programmable logic unit and the multiplexers define the use of those junction points. In such a manner, the pin of the electric driving component 14 is able to be electrically connected to a time circuit inside the electronic core 15. In support of the position design with respect to the indicator 13, it is assumed that the pin of the electric driving component 14 is connected to a connecting point numbered as 3 on the right side of the multiplexer 21 during assembling the wristwatch. In the process of definition or assignment, the programmable logic unit is able to electrically connect the time circuit in the electronic core 15 to the left connecting point on the multiplexer 21 corresponding to the electric driving component 14. Then, a selection signal is transmitted to the multiplexer 21 such that the multiplexer 21 is able to transmit time control signals outputted by the time circuit to the electric driving component 14 via the connecting point 3. In such a manner, the electric driving component 14 can operate according to the time control signals. In this way, the programmable logic unit only needs to define or assign a connection path between the multiplexers and the inner circuit of the electronic core 15. Accordingly, the layout of the programmable logic unit can be simplified.

As described above, the two-dimensional junction points 150 on the external surface of the electronic core 15 can be programmable junction points. In the present invention, the use of junction points 150 may be defined or assigned by three parties, i.e., (1) wristwatch manufacturers, (2) end users, and (3) workers of watch and clock shops. It will be described detailedly as follows.

During manufacturing or assembling the wristwatch, the wristwatch manufacturer may assign or define the use of each junction point 150 by using the programmable logic unit so as to assign the connection paths between the inner circuits of the electronic core 15 and the junction points 150. For example, after the wristwatch manufacturer connects the pin of the electric driving component 14 to any one of the junction points 150 on the external surface of the electronic core 15, said one of the junction points 150 is defined by the programmable logic unit such that the time circuit in the electronic core 15 can be electrically connected to the electric driving component 14 via said one of the junction points 150. Accordingly, the control signals outputted from the time circuit can be transmitted to the electric driving component 14 through said one of the junction points 150.

Also, the present invention allows a wristwatch user to redefine or reassign the use of each junction point 150 after the wristwatch leaves the manufacturing factory. Specifically speaking, by using the aforesaid programmable logic unit, the wristwatch user can make the electric driving component 14 electrically connect to another physical junction point 150 corresponding to another circuit or a junction point 150 connected to the electric driving component 14 is redefined or reassigned to said another circuit. For example, handheld devices (such as smart phones and tablets) possessed by the wristwatch user may communicate with the wristwatch (for example, through wireless communication). When the handheld device receives a message (such as an instant message), the handheld device informs the programmable logic unit of the wristwatch by the wireless communication to change the connection definition or assignment of the junction points 150 such that the electric driving component 14 is electrically connected to another circuit. In such a manner, by a totally different movement (such as a swing), the hands originally used to provide time information can be used to remind the user that a new message is received.

That is to say, the wristwatch can receive a command from outside via the wireless communication (such as Bluetooth and WI-FI). The connection paths between the inner circuits of the electronic core 15 and the junction points 150 are adjusted by the command inputted from outside such that the electric driving component 14 is electrically connected to a specific circuit (for example, a circuit used to notify that a message is received). The signals outputted by the specific circuit may control the electric driving component 14 to drive the indicator 13 such that the indicator 13 moves in a specific manner (such as a regular swing, a random swing, and a swing made according to a specific signal) different from a movement used to indicate the current time.

By altering the connection paths, the electric driving component 14 can be easily connected to different circuits so as to make the indicator 13 generate different movements. This makes the wristwatch possess more functions, and many creative features may be developed accordingly. For example, the hands on the clock may swing in rhythm. Moreover, the indicator 13 of the wristwatch may not be connected to the electric motor. This kind of indicator 13 (such as a thin-type speaker, a light emitting diode (LED), and a small display) can be connected to the inner circuit through the two-dimensional junction points 150 and then operate according to the output signals of the inner circuit. As can be seen, a wristwatch having a lot of new features or functions can be developed by utilizing the present invention.

Furthermore, the personnel working in the watch and clock shops also can assign or define the use of each junction point 150 on the external surface of the electronic core 15, and adjust or alter the connection paths between the inner circuits of the electronic core 15 and the respective junction points 150 by using the programmable logic unit. The wristwatch user may buy new dials, indicators, and/or electric driving components from the watch and clock shops and use an alternative dial or indicator to replace the original one in the original wristwatch. The junction point originally corresponding to the electric driving component 14 may be changed to another one due to the replacement of dial or indicator. For this situation, the workers of the watch and clock shops can easily alter the connection definition or assignment via the programmable logic unit to solve this problem. Accordingly, it is very convenient for the wristwatch user to replace with different designs of dial meter or indicator for the original wristwatch. This is a great inducement to attract customers in the market.

In addition, the electric driving component 14 of the present invention may be mechanically connected to the indicator 13 directly or indirectly. In one embodiment, the electric driving component 14 has a driving shift (not labeled with a reference number), which is directly connected with the indicator 13. In such a manner, the electric driving component 14 can drive the indicator 13 directly. In another embodiment, the electric driving component 14 has the driving shift and a transfer mechanism (not shown) mechanically connected to the driving shift. The driving shift is connected to the indicator 13 via the transfer mechanism. In such a manner, the electric driving component 14 drives the indicator 13 through the transfer mechanism.

Figure 7:
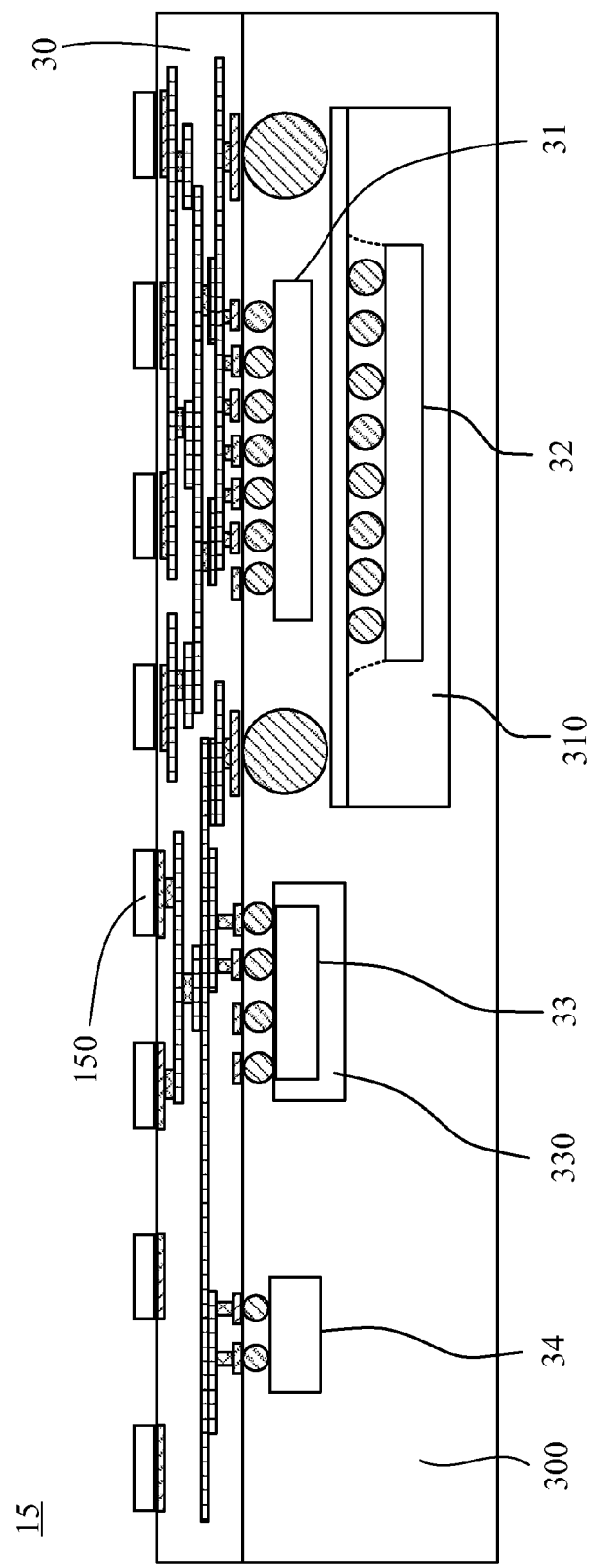
FIG. 7 is a structural diagram showing the electronic core in FIG. 1.

FIG. 7 is a structural diagram showing the electronic core 15 in FIG. 1. In one embodiment, the electronic core 15 may include a package substrate 30, a logic component 31, a memory component 32, and a power management component 33. The electronic core 15 also may include a passive component 34. The package substrate 30 is a thin-film substrate, which is preferred to be a multi-layer interconnection substrate having a plurality of bond pads that extend to the outside to form the two-dimensional junction points 150 on the external surface of the electronic core 15. The multi-layer interconnection substrate 30 provides electrical connections between the logic component 31, the memory component 32, the power management component 33, and the passive component 34. These component 31-34 can be combined with the multi-layer interconnection substrate 30 via solders.

The logic component 31 can be implemented as a processor or a programmable IC. The memory component 32 may comprise a non-volatile memory (such as a NADA flash memory) and a synchronous dynamic random-access memory (SDRAM). The passive component 34 (such as a capacitor) may be coupled between the logic component 31 and the power management component 33. The power management component 33 handles the electrical power supply based on actual needs.

In this embodiment, the memory component 32 may be packaged with a packaging material 310 and the packaged memory component is then stacked with the logic component 31. The power management component 33 also can be packaged with a packing material 330 in advance. Finally, a primary packaging material 300 is used to package the logic component 31, the memory component 32, the power management component 33, and the passive component 34 in a single process such that a single package is formed. The single package serves as an electronic component for facilitating selling.

Above all, the electronic core 15 of the present invention can become a universal electronic core for the wristwatch. It is convenient for the wristwatch manufacturers to achieve various wristwatch designs by adopting the universal electronic core, thereby shortening the product development cycle. Also, the present invention solves the traditional problem of the need to develop electronic cores in response to different wristwatch designs. Also, by utilizing the universal electronic core, the wristwatch assembling is simple and quick.

Figure 8:
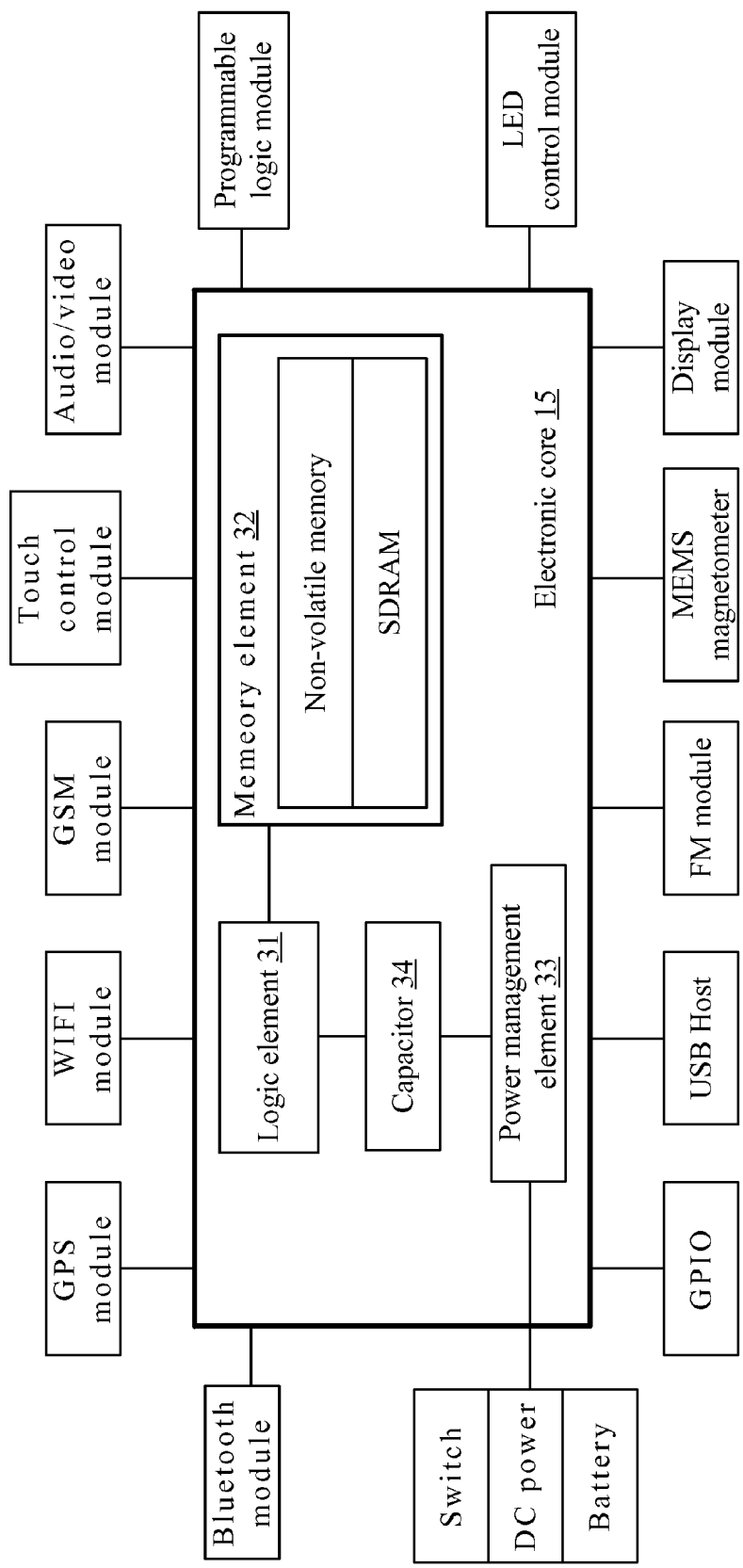
FIG. 8 is a schematic diagram showing extension circuits in a wristwatch of the present invention.

FIG. 8 is a schematic diagram showing extension circuits in the wristwatch of the present invention. In the present invention, the electronic core 15 also may be connected to peripheral electronic components so as to develop a wristwatch having complicated functions. For example, the logic component 31 may be coupled with a programmable logic module, a Bluetooth module, a GPS module, a WIFI module, a GSM module, a touch control module, a LED control module, an audio/video module, a display module, a MEMS magnetometer, a FM module, a USB host controller, a general purpose I/O (GPIO), and etc. In another aspect, the power management component 33 may be coupled with a DC power source, a switch, a battery, or other required components.

Figure 9:
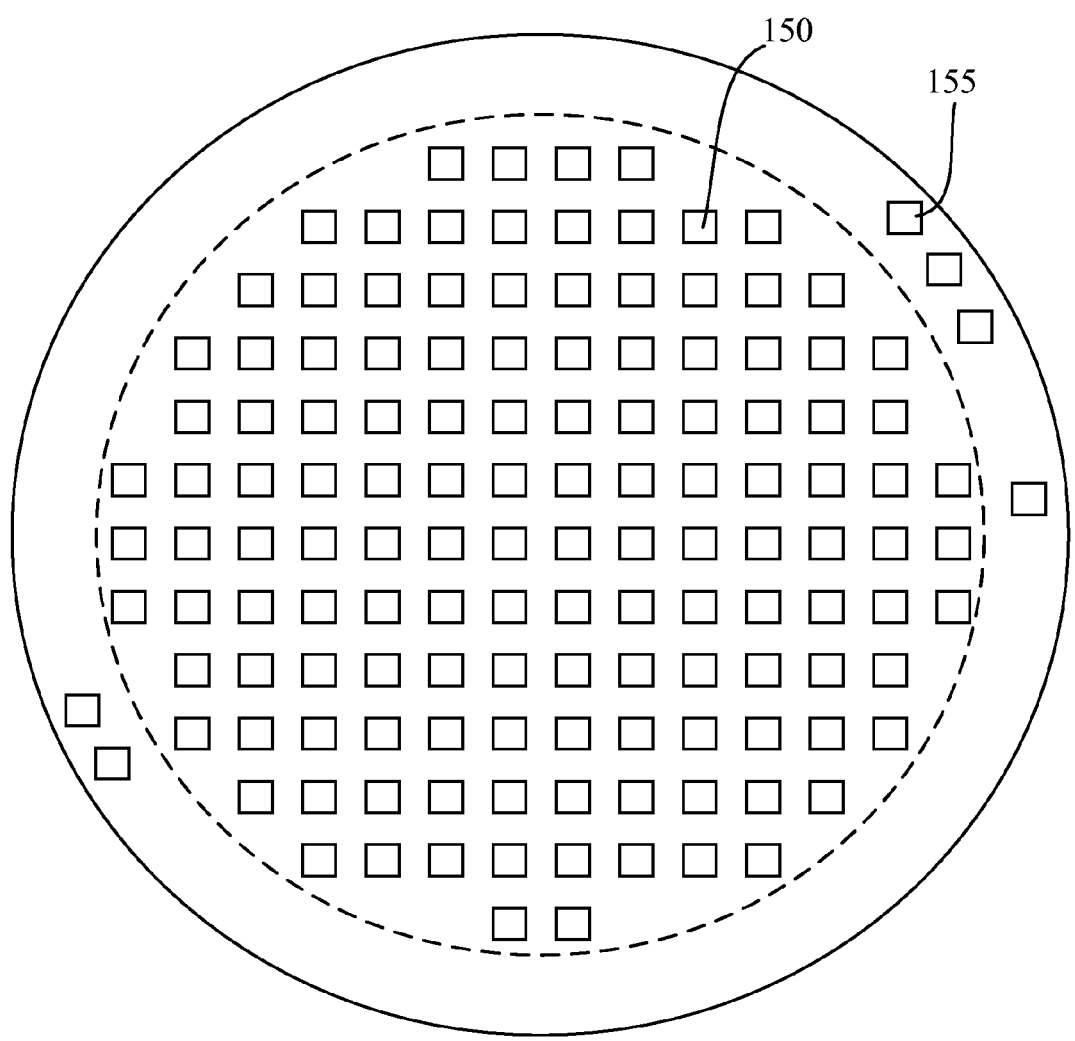
FIG. 9 is a schematic diagram showing a distribution of junction points on the external surface of an electronic core of the present invention.

As shown in FIG. 9, junction points on the external surface of the electronic core 15 may include not only the two-dimensional junction points 150 (located in a range confined by the dash lines), but also non-even distributed or non-regularly distributed junction points 155 such as a power source joint, a GPIO joint, and a signal input/output joint of the programmable logic module used to assign or define the use of the two-dimensional junction points 150.

Figure 10:
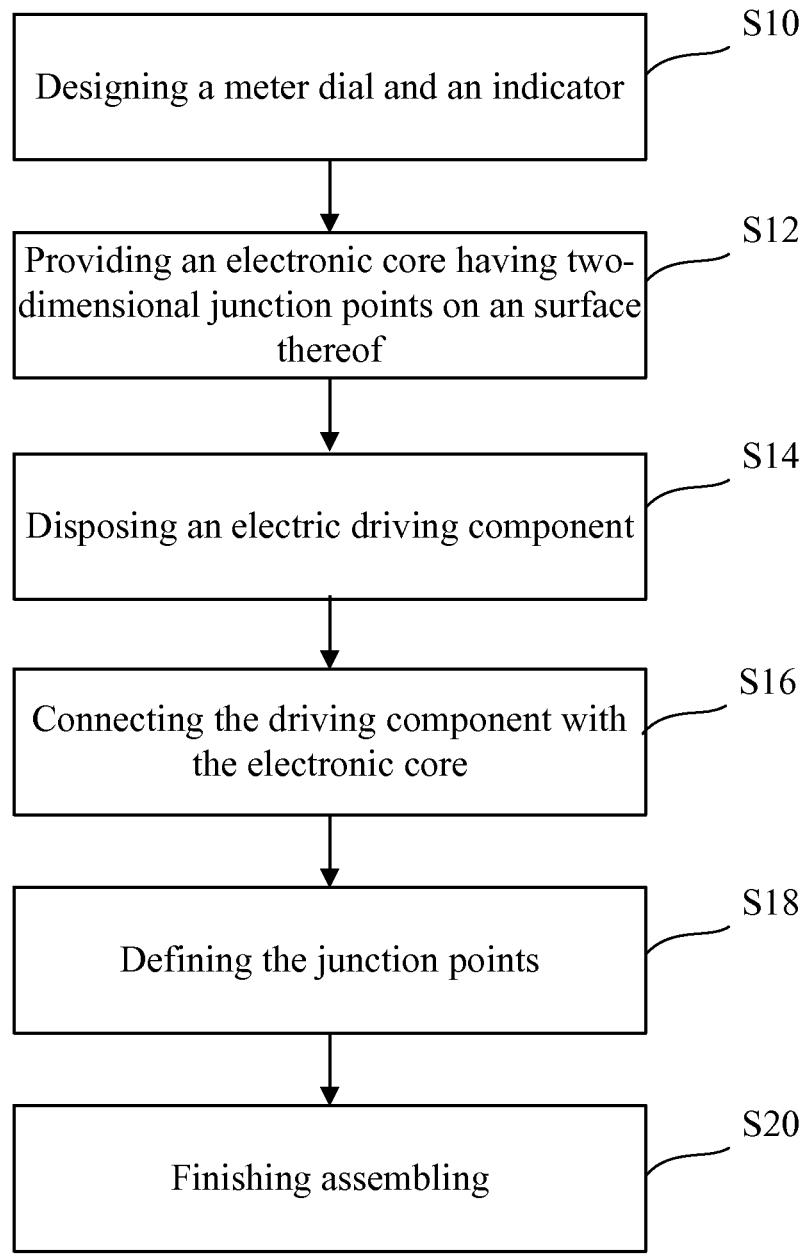
FIG. 10 is a flow chart of a wristwatch manufacturing method according to the present invention.

The present invention also provides a wristwatch manufacturing method. Please refer to a flow chart shown in FIG. 10 in accompanying with above descriptions of the wristwatch structure. Firstly, the dial 12 and the indicator 13 are designed (Step S10), in which the design of the indicator 13 cooperates with that of the dial 12. The designs of the dial 12 and the indicator 13 are not particularly limited in the present invention. That is to say, the present invention allows the wristwatch manufacturers to design the dial 12 and the indicator 13 freely. Next, the electronic core 15 is provided (Step S12). As described above, the electronic core 15 has basic circuits (such as the logic component 31, the memory component 32, the power management component 33, and etc.) packaged therein, and the electronic core 15 has the two-dimensional junction points 150 distributed on the external surface thereof. Next, the electric driving component 14 is disposed (Step S14). Position of at least one electric driving component 14 on the external surface of the electronic core 15 is designed according to the position of the indicator 13. As described above, the electric driving component 14 is used to drive the indicator 13 to make the indicator 13 move correspondingly. Accordingly, the position of the electric driving component 14 may need to match the position of the indicator 13.

Further, Next, the pin of the electric driving component 14 is connected to any one of the junction points 150 of the electronic core 15 (Step S16). In this step, a surface mounted technology may be adopted such that the pin of the electric driving component 14 is connected to at least one of the junction points 150 on the external surface of the electronic core 15.

Further, the use of each junction point 150 is defined or assigned (Step S18). Specifically speaking, the connection paths between the inner circuits of the electronic core 15 and the two-dimensional junction points 150 on the external surface of the electronic core 15 are assigned or defined such that the electric driving component 14 is electrically connected to a specific circuit in the electronic core 15. That is to say, the junction point connected to the electric driving component 14 is assigned to the specific circuit such that the specific circuit can drive or control the electric driving component 14. Finally, all the aforesaid components (such as the dial 12, the indicator 13, the electric driving component 14, and the electronic core 15) are packaged in the watchcase 11 to finish the manufacture of the wristwatch (Step S20).

As described above, it also may dispose a communicative component (such as a wireless communicative component) in the wristwatch. By receiving a command from the outside through the communicative component, the connection paths between the inner circuits of the electronic core 15 and the respective junction points 150 can be adjusted such that the electric driving component 14 is electrically connected to another specific circuit.

Above all, by adopting the two-dimensional junction points, the present invention can greatly enhance the compatibility and convenience in manufacturing or assembling the wristwatch. The wristwatch manufactures are able to develop various types of wristwatches as long as adopting the electronic core of the present invention. Also, the present invention allows the wristwatch user to adjust the connection paths between the inner circuits of the electronic core and the electric driving component. Accordingly, the present invention can develop a wristwatch having many novel functions.

Figure 11A:
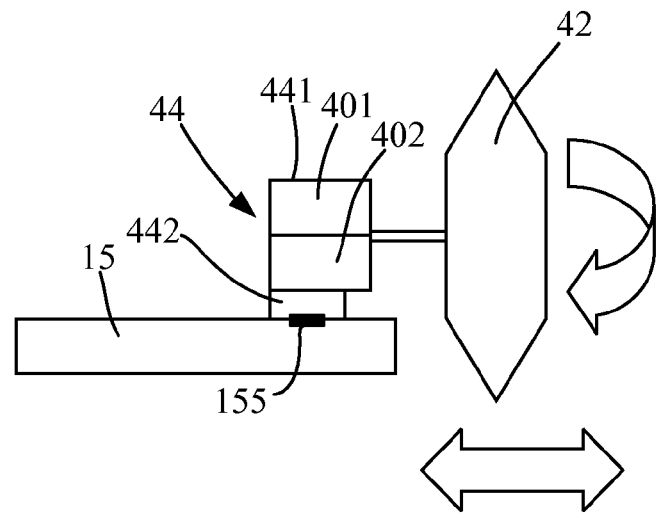
FIG. 11A is a schematic diagram showing an electronic crown at a first specific position in the present invention.

FIG. 11A is a schematic diagram showing an electronic crown for a wristwatch according to the present invention. As described above, junction points on the external surface of the electronic core 15 may include not only the even distributed junction points 150, but also the non-even distributed or non-regularly distributed junction points 155 (see FIG. 9). In the embodiments of the present invention, the electric driving component 14 may correspond to one set of junction points among the even distributed junction points 150 while the electronic signals from the electronic crown may be outputted to the electronic core 15 via an junction point 150 or 155 (i.e., one junction point of the two-dimensional junction points 150 or the non-regularly distributed junction points 155) on the external surface of the electronic core 15 in order to adjust or change the state of the indicator 13, e.g., adjusting the position of a hour hand and/or a minute hand to modify the time information. In a preferable embodiment, the electronic signals outputted by the electronic crown may be outputted to the electronic core 15 through the non-regularly distributed junction points 155.

As shown in FIG. 11A, the electronic crown of the present invention comprises a rotating part 42 and a sensor 44 coupled with the rotating part 42. The sensor 44 comprises a rotating portion 441 and a detecting portion 442. The rotating portion 441 of the sensor 44 rotates (such as being a circular motion) as the wristwatch user rotates the rotating part 42. The detecting portion 442 of the sensor 44 is fixed or fastened. The detecting portion 442 can generate and export the electronic signals in response to the rotation of the rotating portion 441 for adjusting the position of a hand on the clock.

As to a wristwatch driven by an electric power, adjusting the hand position is mostly carried out by pressing a button or turning a gear in conventional skills. The electronic crown of the wristwatch provided in the present invention can operate or move as similar as that of a mechanical watch when adjusting the current time. Accordingly, an emulated mechanical watch can be achieved by developing a wristwatch having its appearance and user operation as the same as the mechanical watch.

In one embodiment, the detecting portion 442 of the sensor 44 may be arranged at a position corresponding to one of the non-regularly distributed junction points 155 on the external surface of the electronic core 15, as shown in FIG. 11A. In another embodiment, the detecting portion 442 of the sensor 44 may be disposed on a circuit board (not shown) such as a printed circuit board (PCB) and then be connected to one of the junction points 155 on the electronic core 15 through wiring lines. It is noted that the detecting signals outputted by the detecting portion 442 of the sensor 44 also may be outputted to the electronic core 15 via one of the junction points 150, rather than the junction points 155.

As shown in FIG. 11A, the rotating portion 441 of the electronic crown may include a first sub portion 401 and a second sub portion 402, or include more than two sub portions. Each sub portion 401, 402 is arranged along the circumference of a circle. Each sub portion 401, 402 possesses a physical characteristic but the sub portions 401, 402 have different physical values (such as a dielectric constant, a resistance, and a permeability) with respect to said characteristic. When the sub portions 401, 402 rotates relatively with respect to the detecting portion 442, the detecting portion 442 detects different levels of electronic signals based on the position changes of the first sub portion 401 and the second sub portion 402 on the circular circumference.

Figure 12A:
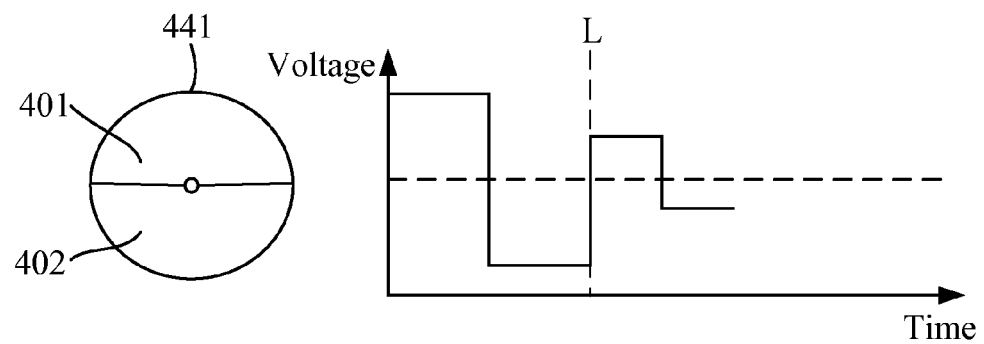
FIG. 12A is a schematic diagram depicts a waveform of a detected electronic signal, in which a first sub portion and a second sub portion are disposed symmetrically in the electronic crown of the present invention.
Figure 12B:
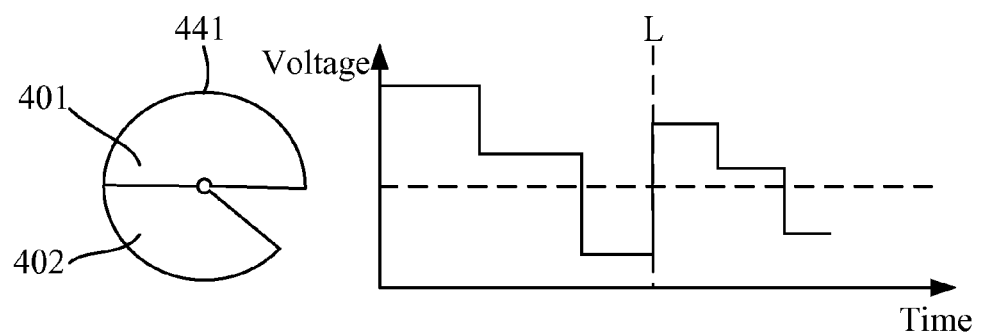
FIG. 12B is a schematic diagram depicts a waveform of a detected electronic signal, in which the first sub portion and the second sub portion are disposed asymmetrically in the electronic crown of the present invention.

For example, as shown in FIG. 12A, the detecting portion 442 detects two distinct levels of electronic signals (as shown by the waveform on the left side of a dash line L in FIG. 12A) when the first sub portion 401 and the second sub portion 402 are arranged symmetrically. As shown in FIG. 12B, the detecting portion 442 detects at least three distinct levels of electronic signals (as shown by the waveform on the left side of a dash line L in FIG. 12B) when the first sub portion 401 and the second sub portion 402 are arranged asymmetrically. The electronic core 15 may output corresponding adjusting signals for adjusting the position of the indicator 13 as long as the electronic core 15 receives the electronic signals exported by the detecting portion 442. In the embodiment shown in FIG. 12B, the electronic signals having opposite waveforms may be generated when the user rotates the electronic crown clockwise and counterclockwise. In such a manner, it is easily to control the hands on the clock to move in a clockwise direction and in a counterclockwise direction.

Figure 11B:
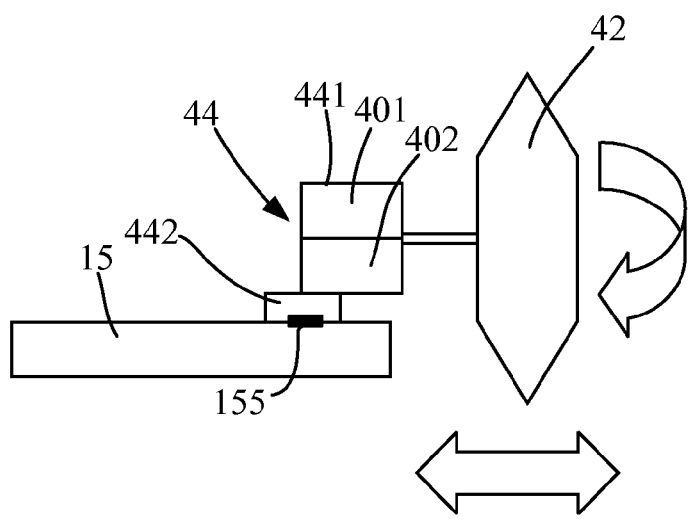
FIG. 11B is a schematic diagram showing the electronic crown at a second specific position in the present invention.

In another aspect, when the user pushes and draws the rotating part 42, the rotating portion 441 of the electronic crown may move along a rotating axis, and the first sub portion 401 together with the second sub portion 402 may park at a first specific position (as shown in FIG. 11A) and a second specific position (as shown in FIG. 11B) on the rotating axis. When the first sub portion 401 and the second sub portion 402 are parked at the first specific position and are rotated, an electronic signal detected by the detecting portion 442 is similar to the waveform shown on the left side of the dash line L in FIG. 12A (or in FIG. 12B). When the first sub portion 401 and the second sub portion 402 are parked at the second specific position and are rotated, an electronic signal detected by the detecting portion 442 is similar to the waveform shown on the right side of the dash line L in FIG. 12A (or in FIG. 12B). That is, when the first sub portion 401 and the second sub portion 402 are parked at the second specific position, the detecting portion 442 detects a relatively weak signal and the voltage level of the detected signal is relatively small. By this way, the electronic core 15 can control different hands or indicators with different signal waveforms. For example, the position of the hour hand can be adjusted when the user pushes the rotating part 42 so as to make the rotating portion 441 park at the first specific position. The position of the minute hand can be adjusted when the user pushes the rotating part 42 so as to make the rotating portion 441 park at the second specific position.

Specifically speaking, in one embodiment, the first sub portion 401 and the second sub portion 402 are objects having different dielectric constants. The detecting portion 442 includes a capacitance detecting component for detecting a capacitance between two electrodes, for example. The capacitance may change due to different positions where the first sub portion 401 and the second sub portion 402 are located at. The detecting portion 401 detects different voltage levels of electronic signals as the capacitance is changed. In another embodiment, the first sub portion 401 and the second sub portion 402 of the rotating portion 441 can be magnetic materials having distinct magnetic strength. The detecting portion 442 includes a conductive coil. When the first sub portion 401 and the second sub portion 402 are rotated, the conductive coil of the detecting portion 442 may generate an electric current due to the change of magnetic flux. Accordingly, this generates distinct voltage levels of electronic signals. In still another embodiment, the first sub portion 401 and the second sub portion 402 of the rotating portion 441 can be objects having different magnitudes of permeability. The detecting portion 442 includes a coil with an electric current applied thereto. The magnetic field generated by the coil may induce the first sub portion 401 and the second sub portion 402 to make them generate different magnitudes of magnetic field. Accordingly, by detecting the change of the magnetic field, distinct voltage levels of electronic signals can be generated. In the present invention, the sensor 44 of the electronic crown can output the electronic signals by detecting the change of a capacitance, an inductance, a resistance, an electric filed, or a magnetic field.

Figure 13A:
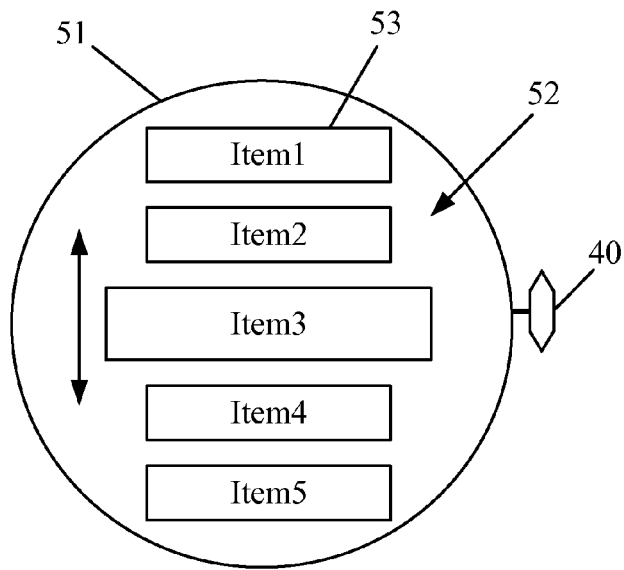
FIG. 13A is a schematic diagram showing a wristwatch having a display device.
Figure 13B:
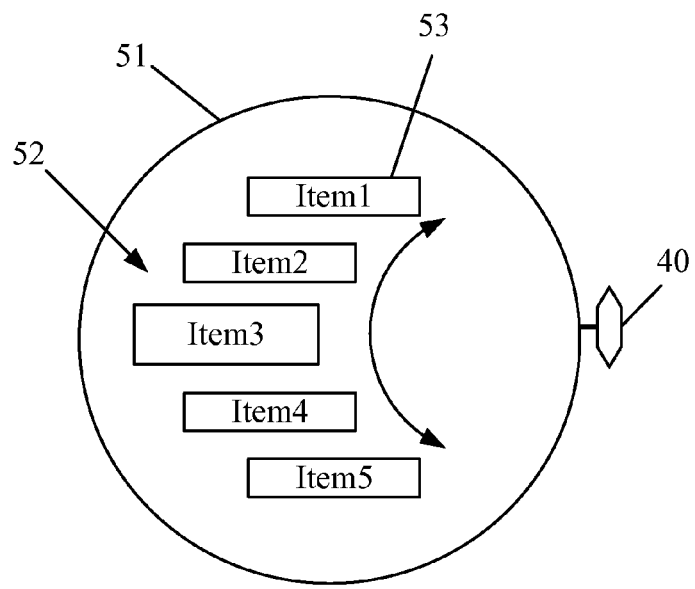
FIG. 13B is a schematic diagram showing another wristwatch having a display device.

Please refer to FIG. 13A and FIG. 13B. The electronic crown described in above embodiments is also applicable to a wristwatch having a display (such as a liquid crystal display device) 51. The time relevant information is displayed on a screen of the display 51. For example, the display 51 may display hands and time scales on the screen, or display the current time by digital numbers. In addition to displaying the current time on the screen, the smart wristwatch may have other functions and may list these functions (e.g., items 53) or other settings on the screen of the display 51 by using a menu 52. The electronic crown 40 of the wristwatch can be used to switch the selection of the items 53 and confirm the selected item 53.

When the user rotates the electronic crown 40, the electronic crown 40 exports the electronic signals and the electronic signals are used to control the display 51 so as to switch or select the item 53 listed in the menu 52. For example, each time the user turns the electronic crown 40, the item 53 of the menu 52 moves to next position from top to bottom and the positions of the other items 53 are changed in the same manner, and the selected item 53 is enlarged as well. When the electronic crown 40 is rotated in an opposite direction, the items 53 move from bottom to top, as shown in FIG. 13A. In another example, the items 53 of the menu 52 may move along a direction indicated by an arrow in FIG. 13B. Also, after the user pushes or draws the electronic crown 40, the selected item 53 is confirmed and the function or setting represented by the selected item 53 is then executed.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A wristwatch structure, which has a dial, an indicator arranged in accordance with the dial, and an electric driving component connected to the indicator, the electric driving component being used to drive the indicator to make the indicator operate correspondingly, said wristwatch structure comprising:
    an electronic core having an integrated circuit unit packaged therein, the electronic core having a plurality of two-dimensional junction points; and
    an electronic crown having a rotating part and a sensor, the sensor having a rotating portion and a fixed detecting portion, the rotating portion rotating as the rotating part rotates, the detecting portion detecting an electronic signal according to a rotation of the rotating portion for altering a state of the indicator,
    wherein the detecting portion of the electronic crown exports the electronic signal to the electronic core via one junction point among the two-dimensional junction points, and the electric driving component is electrically connected to one set of junction points among the two-dimensional junction points, and
    wherein the rotating portion of the electronic crown comprises at least two sub portions having different magnitude of a physic parameter.

2. The wristwatch structure according to claim 1, wherein the plural two-dimensional distributed junction points are evenly distributed and are located at regular positions.

3. The wristwatch structure according to claim 1, wherein the plural two-dimensional distributed junction points comprises non-regularly distributed junction points.

4. The wristwatch structure according to claim 3, wherein the at least two sub portions are arranged symmetrically.

5. The wristwatch structure according to claim 3, wherein the at least two sub portions are arranged asymmetrically.

6. The wristwatch structure according to claim 3, wherein the detecting portion of the electronic crown detects different physical values of the at least two sub portions to export different levels of electronic signals.

7. The wristwatch structure according to claim 3, wherein the physic parameter comprises a dielectric constant.

8. The wristwatch structure according to claim 3, wherein the physic parameter comprises a permeability.

9. The wristwatch structure according to claim 1, wherein the detecting portion of the electronic crown exports the electronic signals by detecting a change of at least one of a capacitance, an inductance, a resistance, an electric filed, and a magnetic field.

10. An electronic crown for a wristwatch, comprising:
    a rotating part for being held by a user; and
    a sensor coupled with the rotating part, the sensor having a rotating portion and a fixed detecting portion, the rotating portion rotating as the rotating part rotates, the rotating portion comprising at least two sub portions having different magnitude of a physic parameter, the detecting portion of the electronic crown detecting different physical values of the at least two sub portions to export different levels of electronic signals.

11. The electronic crown according to claim 10, wherein the at least two sub portions are arranged symmetrically.

12. The electronic crown according to claim 10, wherein the at least two sub portions are arranged asymmetrically.

13. The electronic crown according to claim 10, wherein the physic parameter comprises a dielectric constant.

14. The electronic crown according to claim 10, wherein the physic parameter comprises a permeability.

15. The electronic crown according to claim 10, wherein the sensor outputs the electronic signals by detecting a change of at least one of a capacitance, an inductance, a resistance, an electric filed, and a magnetic field.

16. A wristwatch having a display, comprising:
    the display for displaying time relevant information on a screen and for displaying a plurality of items listed in an operation menu on the screen;
    an electronic crown comprising a rotating part and a sensor, the sensor having a rotating portion and a fixed detecting portion, the rotating portion rotating as the rotating part rotates, the rotating portion comprising at least two sub portions having different magnitude of a physic parameter, the detecting portion exporting an electronic signal upon the rotating portion rotates so as to switch the items listed in the operation menu when the rotating portion is rotated.

* * * * *